United States Patent [19]
Dendi

[11] Patent Number: 5,872,782
[45] Date of Patent: Feb. 16, 1999

[54] ENCAPSULATION OF PROPRIETARY PROTOCOL INFORMATION CONFORMING TO THE ITU-T RECOMMENDATION Q.763 ISUP STANDARD

[75] Inventor: Ranga R. Dendi, Plano, Tex.

[73] Assignee: MCIWorldCom, Inc., Ga.

[21] Appl. No.: 864,253

[22] Filed: May 28, 1997

Related U.S. Application Data

[63] Continuation-in-part of Ser. No. 653,885, May 28, 1996.

[51] Int. Cl.$^6$ .......................... H04L 12/50; H04Q 11/00; H04J 3/12
[52] U.S. Cl. .......................... 370/385; 370/426; 370/524; 379/220; 379/230
[58] Field of Search .................................... 370/385, 524, 370/466, 410, 220, 259, 260, 467, 426; 379/230, 220, 221, 229, 201, 207; 395/200.5, 200.52

[56] References Cited

U.S. PATENT DOCUMENTS

| | | | |
|---|---|---|---|
| 5,359,646 | 10/1994 | Johnson et al. | 379/27 |
| 5,539,817 | 7/1996 | Wilkes | 370/410 |
| 5,561,769 | 10/1996 | Kumar et al. | 39/200.32 |
| 5,572,530 | 11/1996 | Chitre et al. | 370/524 |
| 5,610,977 | 3/1997 | Williams et al. | 370/385 |

*Primary Examiner*—Jason Chan
*Assistant Examiner*—Melissa Kay Carman

[57] ABSTRACT

The present invention is a system and method for transmitting proprietary parameters in a telecommunications network conforming to the ISUP Standard. The method includes the steps of identifying proprietary parameters to be transmitted as part of an ISUP signaling message that includes a network specific Generic Digits parameter and encapsulating those parameters within the network specific Generic Digits parameter.

9 Claims, 1 Drawing Sheet

ENCAPSULATION OF PROPRIETARY PROTOCOL INFORMATION CONFORMING TO THE ITU-T RECOMMENDATION Q.763 ISUP STANDARD

This is a continuation-in-part of Ser. No. 08/653,885, filed May 28, 1996.

BACKGROUND OF THE INVENTION

1 Field of the Invention

The present invention relates generally to systems and methods for network switching, and more particularly to efficient routing of communication paths in a telecommunications system.

2. Related Art

A conventional Common Channel Signaling (CCS) telecommunications network comprises three basic components: Customer Premises Equipments (CPEs; for example, a private branch exchange (PBX)), communications busses (also known as links; for example, telephone lines) and nodes (for example, switches). The switches are used to selectively connect the CPEs via the links. A CCS network is characterized by the separation of signaling links and traffic links. Switches in a CCS network establish traffic links between CPEs by exchanging signaling messages via signaling links that specify tasks to be performed on the traffic links. The format of these signaling messages is typically specified by a standard.

One such standard is the Integrated Services Digital Network (ISDN) User Part (ISUP) standard, referred to hereinafter as "the standard" or "the ISUP standard." The North American ISUP standard is presented in a document entitled "American National Standards Institute (ANSI) Signaling System No. 7 (SS7) Integrated Services Digital Network (ISDN) User Part (ISUP), ANSI T1.113 (1995)," which is incorporated herein by reference in its entirety. The international ISUP standard is also presented in a document entitled "ITU-T Recommendation Q.763 Signaling System No. 7 (SS7) Integrated Services Digital Network (ISDN) User Part (ISUP), Formats and Codes."

The standard specifies a set of signaling messages that a network must support in order to comply with the standard. Each of these signaling messages must be accompanied by one or more parameters; these parameters are also defined by the standard. The standard also provides for several "spare" parameters. Spare parameters are of two types. Under the ANSI ISUP standard, these two types are referred to as "reserved" and "network specific." Under the ITU ISUP standard, a country can develop a country-specific ISUP standard; under such a standard, the "network specific" parameters are generally referred to "country specific."

Reserved spare parameters are those that are not currently defined by the standard, but that may be defined by the standard at some future time. Network service providers are free to use the network specific spare parameters to transmit proprietary data to implement proprietary services to supplement those provided by the standard. A service provider will typically offer many proprietary services, and thus will require many spare parameters to implement those services. When a service provider exhausts the network specific spare parameters, he has little recourse but to employ some of the reserved spare parameters.

However, if a service provider employs a reserved spare parameter to implement a proprietary feature, and subsequently redefines that spare parameter, the service provider will no longer be in compliance with the standard. In order to comply with the new standard, the service provider must redefine the proprietary feature to use a different spare parameter. To implement such a parameter change, a service provider must change the call processing software in its network switches. This is an expensive and time-consuming task. Further, if the newly-selected spare parameter is a reserved spare parameter, it may subsequently be re-assigned. Thus, this solution is not a permanent one. Further, a service provider may require more spare parameters than are available.

What is needed, therefore, is a method for transmitting proprietary data that is independent of the reserved spare parameter data structure specified by the standard.

SUMMARY OF THE INVENTION

The present invention is a system and method for transmitting proprietary parameters without using the reserved "spare" parameters specified by the ISUP standard. In a preferred embodiment of the present invention, proprietary data is "encapsulated" within the network specific Generic Digits parameter defined by the standard.

One advantage of the present invention is that it permits a service provider to define proprietary parameters without the use of spare parameters. Another advantage of the present invention is that it permits a service provider to define more proprietary parameters than there are spare parameters.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

The present invention is a system and method for transmitting proprietary parameters without using the reserved spare parameters specified by the ISUP standard. In a preferred embodiment of the present invention, proprietary data is "encapsulated" within the network specific Generic Digits parameter defined by the ISUP standard.

Figure 1:
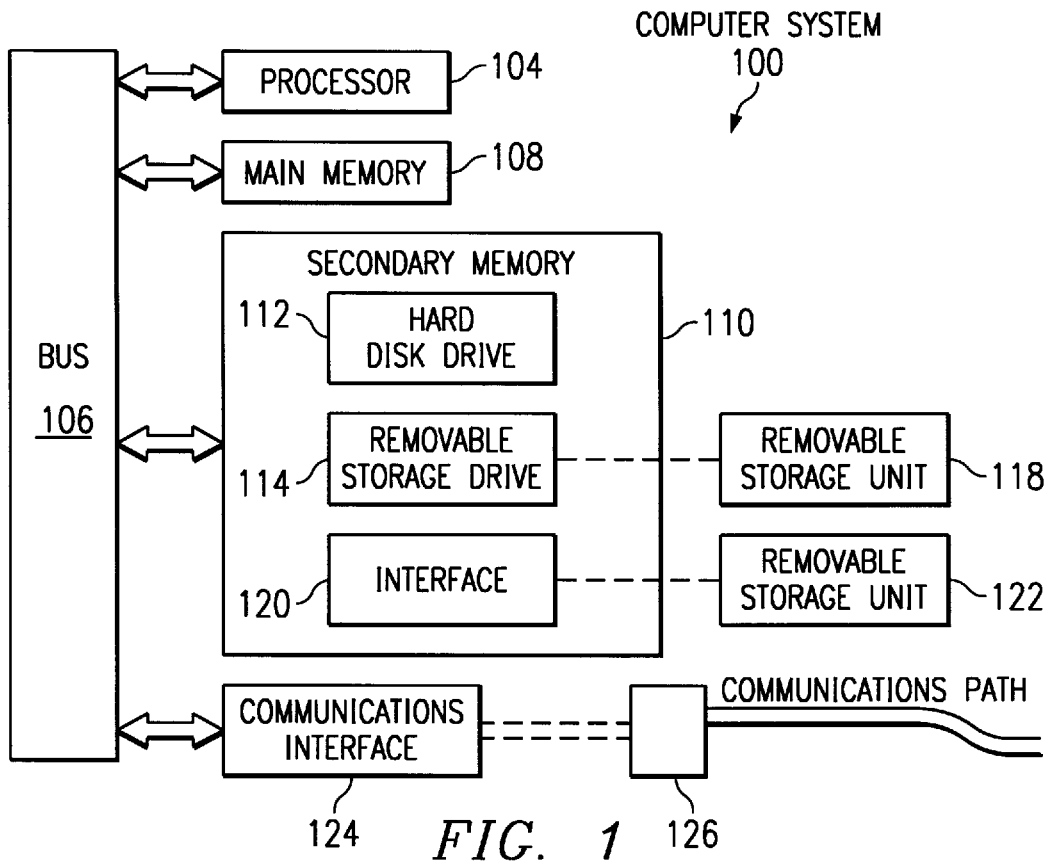
FIG. 1 is a block diagram illustrating an example environment in which the present invention can operate.

Before describing the operation of the present invention in detail, it is useful to first describe an example environment in which the invention can operate. FIG. 1 is a block diagram illustrating an example environment in which the present invention can operate. The environment is a computer system 100 that includes one or more processors, such as processor 104. The processor 104 is connected to a communications bus 106. Various software embodiments are described in terms of this example computer system. After reading this description, it will be apparent to a person skilled in the relevant art how to implement the invention using other computer systems and/or computer architectures.

Computer system 100 also includes a main memory 108, preferably random access memory (RAM), and can also include a secondary memory 110. The secondary memory 110 can include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc., which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means can include, for example, a removable storage unit 122 and an interface 120. Examples can include a program cartridge and cartridge interface (such as that found in video game devices), a removable memory chip (such as an EPROM or PROM) and associated socket, and other removable storage units 122 and interfaces 120 which allow software and data to be transferred from the removable storage unit 122 to computer system 100.

Computer system 100 can also include a communications interface 124. Communications interface 124 allows software and data to be transferred between computer system 100 and external devices through communications path 126. Examples of communications interface 124 can include a modem, a network interface (such as an Ethernet card), a communications port, etc. Software and data transferred through communications interface 124 are in the form of signals which can be electronic, electromagnetic, optical or other signals capable of being received by communications interface 124 through communications path 126.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

Figure 2:
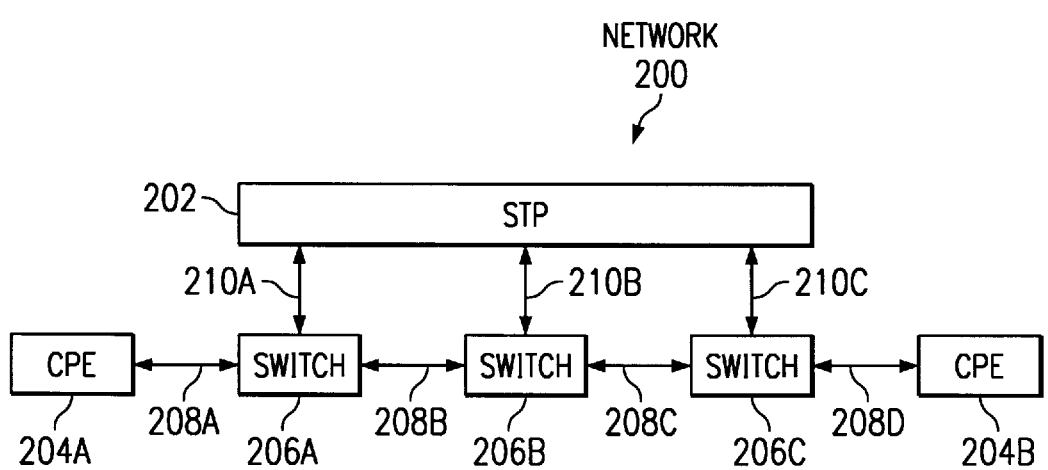
FIG. 2 depicts an exemplary configuration for a telecommunications network.

FIG. 2 depicts an exemplary configuration for a telecommunications network 200. In a preferred embodiment of the present invention, network 200 is a CCS network. Network 200 includes signal transfer point (STP) 202, customer premises equipments (CPEs) 204, and switches 206, also known as signaling points. A CPE 204 can be, for example, a private branch exchange (PBX). CPE 204A is connected to CPE 204B via traffic links 208. Traffic links 208 are further connected by switches 206. This connection defines the physical channel upon which digital data is transported between CPEs 204. Switches 206 are connected to STP 202 via signaling links 210.

Using these connections, switches 206 and STP 202 can coordinate the setup of a traffic channel along traffic links 208. This coordination is accomplished through the transport of signaling messages that provision specific channels within traffic links 208. One set of such signaling messages is specified by the Integrated Services Digital Network (ISDN) User Part (ISUP) standard, referred to hereinafter as "the standard" or "the ISUP standard." The North American standard is presented in a document entitled "American National Standards Institute (ANSI) Signaling System No. 7 (SS7) Integrated Services Digital Network (ISDN) User Part (ISUP), ANSI T1.113 (1995)," which is incorporated herein by reference in its entirety. The international ISUP standard is also presented in a document entitled "ITU-T Recommendation Q.763 Signaling System No. 7 (SS7) Integrated Services Digital Network (ISDN) User Part (ISUP), Formats and Codes" which is incorporated herein by reference in its entirety. For ease of illustration, the invention is described with specific reference to the ANSI standard. However, the present invention can be used with other standards, such as the ITU standard and any other country-specific ISUP standard, without departing from the spirit and scope of the present invention, as would be apparent to one skilled in the relevant art.

Each ISUP signaling message accomplishes a particular task for a particular traffic link, and contains the four fields depicted in Table 1. The switch transmitting the signaling message is known as the origination point, and the switch receiving the signaling message is known as the destination point.

TABLE 1

Routing Label
Circuit Identification Code
Message Type
Parameters

Each field is formed of an integral number of bytes. The Routing Label field defines the coordinates (that is, addresses) of the origination and destination points. The Circuit Identification Code field identifies the traffic link on which the task will be performed. The Routing Label field and the Circuit Identification Code field are known collectively as the "Header" of the signaling message.

The Message Type identifies the task to be performed on the selected traffic link. The Parameters field contains application-specific data for the signaling message. The Message Type field and the Parameters field are known collectively as the "Application Data" of the signaling message, and together contain the data elements needed to complete the task. Each of these fields is defined in further detail below.

The Routing Label field contains the information necessary to deliver the signaling message to the destination point. The Routing Label field is placed at the beginning of the signaling message and occupies seven bytes as illustrated in Table 2. The same Routing Label is used for all signaling messages that refer to the same traffic link.

TABLE 2

| Byte # | Bit # | | | | | | | |
|---|---|---|---|---|---|---|---|---|
| | 7 | 6 | 5 | 4 | 3 | 2 | 1 | 0 |
| 1 | Destination Point Code (Byte 1) | | | | | | | |
| 2 | Destination Point Code (Byte 2) | | | | | | | |
| 3 | Destination Point Code (Byte 3) | | | | | | | |

TABLE 2-continued

| Byte # | Bit # | | | | | | | |
|---|---|---|---|---|---|---|---|---|
| | 7 | 6 | 5 | 4 | 3 | 2 | 1 | 0 |
| 4 | Origination Point Code (Byte 1) | | | | | | | |
| 5 | Origination Point Code (Byte 2) | | | | | | | |
| 6 | Origination Point Code (Byte 3) | | | | | | | |
| 7 | Signaling Link Selection | | | | | | | |

The Destination Point Code indicates the address of the destination point. The Origination Point Code indicates the address of the origination point. The Signaling Link Selection indicates which link is used to transmit the signaling message.

The Circuit Identification Code identifies the traffic link on which the task defined by the signaling message will be performed. The structure of the Circuit Identification Code field is illustrated in Table 3. Byte #1 contains the least significant bits (LSB) of the Circuit Identification Code, and Byte #2 contains the most significant bits (MSB).

TABLE 3

| Byte # | Bit # | | | | | | | |
|---|---|---|---|---|---|---|---|---|
| | 7 | 6 | 5 | 4 | 3 | 2 | 1 | 0 |
| 1 | Circuit Identification Code (LSB) | | | | | | | |
| 2 | Spare | | | Circuit Identification Code (MSB) | | | | |

The Message Type identifies the task to be performed on the selected traffic link. The Message Type field is a one-byte field, as shown in Table 4. Some of the Message Types that are not defined can be used by service providers to implement proprietary features.

TABLE 4

| Byte # | Bit # | | | | | | | |
|---|---|---|---|---|---|---|---|---|
| | 7 | 6 | 5 | 4 | 3 | 2 | 1 | 0 |
| 1 | Message Type | | | | | | | |

Each ISUP signaling message includes at least one parameter. Parameters can be mandatory or optional, and can be of fixed or variable length. The ISUP standard contemplates the use of up to 256 parameters; of these, the standard defines approximately 60. The standard also provides for several "spare" parameters. Under the ANSI ISUP standard, these two types are referred to as "reserved" and "network specific." Under the ITU ISUP standard, a country can develop a country-specific ISUP standard; under such a standard, the "network specific" parameters are referred to "country specific." The following discussion of "network specific" parameters also applies to these "country specific" parameters," as would be apparent to one skilled in the relevant art.

Reserved spare parameters are those that are not currently defined by the standard, but that may be defined by the standard at some future time. Network service providers are free to use the network specific spare parameters to transmit proprietary data to implement proprietary services to supplement those provided by the standard. A service provider will typically offer many proprietary services, and thus will require many spare parameters to implement those services. When a service provider exhausts the network specific spare parameters, he has little recourse but to employ some of the reserved spare parameters.

However, as discussed in the Background section, if a service provider employs a reserved spare parameter to implement a proprietary feature, and the standard subsequently redefines that parameter, the service provider will no longer be in compliance with the standard. In order to comply with the revised standard, the service provider must redefine the proprietary feature to use a different spare parameter.

One of the network specific parameters defined by the standard is the network specific Generic Digits parameter. The format of the network specific Generic Digits parameter field is illustrated in Table 5.

TABLE 5

| Byte # | Bit # | | | | | | | |
|---|---|---|---|---|---|---|---|---|
| | 7 | 6 | 5 | 4 | 3 | 2 | 1 | 0 |
| 1 | Parameter Name | | | | | | | |
| 2 | Parameter Length | | | | | | | |
| 3 | Encoding Scheme | | | Type of Digits | | | | |
| 4 | Digits | | | | | | | |
| : | : | | | | | | | |
| n | Digits | | | | | | | |

Byte #3 includes the Encoding Scheme (for example, binary-coded decimal, binary, and the like) and the Type of Digits. Bytes #4 through #n contain the Digits. The assignments for the Type of Digits values are listed in Table 6.

TABLE 6

| Type of Digits | Use |
|---|---|
| 00000 | Account Code |
| 00001 | Authorization Code |
| 00010 | Private Network Traveling Class Mark |
| 00011 through 01110 | Spare |
| 01111 | Bill-to Number |
| 10000 through 11110 | Reserved for Network-Specific Use |
| 11111 | Reserved for Extension |

The Type of Digits from binary 10000 through binary 11110 are reserved for network-specific use. In a preferred embodiment of the present invention, one or more of the Type of Digits in this range is used as an envelope to encapsulate data needed by service providers to implement proprietary features.

In a preferred embodiment of the present invention, the Type of Digits equals 11001, the encoding scheme is binary, and the structure of the network specific Generic Digits field is as illustrated in Table 7.

TABLE 7

| Byte # | Bit # | | | | | | | |
|---|---|---|---|---|---|---|---|---|
| | 7 | 6 | 5 | 4 | 3 | 2 | 1 | 0 |
| 1 | 011 | | | | 11001 | | | |
| 2 ... $P_1$ | Proprietary Parameter 1 | | | | | | | |
| $P_1 + 1 ... P_2$ | Proprietary Parameter 2 | | | | | | | |
| . | . | | | | | | | |
| . | . | | | | | | | |
| . | . | | | | | | | |

TABLE 7-continued

| Byte # | Bit # | | | | | | | |
|---|---|---|---|---|---|---|---|---|
| | 7 | 6 | 5 | 4 | 3 | 2 | 1 | 0 |
| $P_{n-1} + 1 \ldots P_n$ | Proprietary Parameter n | | | | | | | |
| $P_n + 1$ | End of Proprietary Parameters (Optional) | | | | | | | |

Each of the Proprietary Parameters includes a name field and a length field. In a preferred embodiment of the present invention, an optional End of Proprietary Parameters field is included to facilitate signaling message parsing.

According to a preferred embodiment of the present invention, a service provider can encapsulate proprietary parameters within the network specific Generic Digits parameter defined by the standard, as described above. Because the proprietary parameters are encapsulated within a defined parameter rather than within reserved spare parameters, they are not affected by subsequent definition of spare parameters. For the same reason, a service provider is not limited by the number of spare parameters, but can define as many proprietary parameters as needed.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In a telecommunications network conforming to the ISUP standard, a method for transmitting proprietary parameters, comprising the steps of:
   (a) identifying proprietary parameters to be transmitted as part of an ISUP signaling message that includes a network specific Generic Digits parameter; and
   (b) encapsulating said parameters within said network specific Generic Digits parameter.

2. The method of claim 1, wherein said ISUP standard is the ITU-T Recommendation Q.763 Signaling System No. 7 ISUP standard.

3. The method of claim 2, wherein said ISUP standard is a country-specific ISUP standard and said network specific Generic Digits parameter is a country-specific Generic Digits parameter.

4. In a telecommunications network conforming to the ISUP standard, a computer program product comprising:
   a computer usable medium having computer readable program code means embodied in said medium for causing an application program to execute on a computer system, said computer readable program code means comprising:
      a computer readable first program code means for causing the computer system to identify proprietary parameters to be transmitted as part of an ISUP signaling message including a network specific Generic Digits parameter; and
      a computer readable second program code means for causing the computer system to encapsulate said parameters within said network specific Generic Digits parameter.

5. The computer program product of claim 4, wherein said ISUP standard is the ITU-T Recommendation Q.763 Signaling System No. 7 ISUP standard.

6. The computer program product of claim 5, wherein said ISUP standard is a country-specific ISUP standard and said network specific Generic Digits parameter is a country-specific Generic Digits parameter.

7. In a telecommunications network conforming to the ISUP standard, a system for transmitting proprietary parameters, comprising:
   means for identifying proprietary parameters to be transmitted as part of an ISUP signaling message including a network specific Generic Digits parameter; and
   means for encapsulating said parameters within said network specific Generic Digits parameter.

8. The system of claim 7, wherein said ISUP standard is the ITU-T Recommendation Q.763 Signaling System No. 7 ISUP standard.

9. The system of claim 8, wherein said ISUP standard is a country-specific ISUP standard and said network specific Generic Digits parameter is a country-specific Generic Digits parameter.

* * * * *